United States Patent
Tadokoro et al.

(10) Patent No.: US 9,735,433 B2
(45) Date of Patent: Aug. 15, 2017

(54) FUEL CELL

(75) Inventors: Kenichiro Tadokoro, Tokyo (JP); Kazumi Mizukami, Tokyo (JP); Takashi Iijima, Tokyo (JP); Hideaki Sawada, Tokyo (JP); Tomohiro Hada, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 745 days.

(21) Appl. No.: 12/736,329

(22) PCT Filed: Mar. 26, 2009

(86) PCT No.: PCT/JP2009/056838
§ 371 (c)(1),
(2), (4) Date: Nov. 5, 2010

(87) PCT Pub. No.: WO2009/123274
PCT Pub. Date: Oct. 8, 2009

(65) Prior Publication Data
US 2011/0045383 A1 Feb. 24, 2011

(30) Foreign Application Priority Data
Apr. 1, 2008 (JP) ................................. 2008-094906

(51) Int. Cl.
*H01M 4/92* (2006.01)
*H01M 8/1018* (2016.01)

(52) U.S. Cl.
CPC ............. *H01M 4/92* (2013.01); *H01M 4/926* (2013.01); *H01M 2008/1095* (2013.01)

(58) Field of Classification Search
CPC ............................ Y02E 60/50; H01M 8/0234
(Continued)

(56) References Cited

U.S. PATENT DOCUMENTS 4,740,434 A * 4/1988 Hirota .................. H01M 4/96
429/105
5,316,990 A * 5/1994 Cooper .................. B01J 21/18
502/163
(Continued)

FOREIGN PATENT DOCUMENTS

JP 4-118858 4/1992
JP 2003-109606 4/2003
(Continued)

OTHER PUBLICATIONS

International Search Report dated Jul. 14, 2009 issued in corresponding PCT Application No. PCT/JP2009/056838.

*Primary Examiner* — Alix Eggerding
(74) *Attorney, Agent, or Firm* — Birch, Stewart, Kolasch & Birch, LLP

(57) ABSTRACT

The present invention relates to a fuel cell exhibiting a high performance regardless of the humidification conditions. In short, it is a fuel cell comprised of a proton-conducting electrolyte membrane sandwiched between a pair of catalyst layers, wherein a catalyst layer of at least a cathode contains a catalyst ingredient, electrolyte material, and carbon material; the carbon material is comprised of three types of materials of a catalyst-supporting carbon material supporting the catalyst ingredient, a conductivity-aiding carbon material not supporting the catalyst ingredient, and a gas-diffusing carbon material not supporting the catalyst ingredient; the catalyst layer is comprised of two phases of a catalyst aggregated phase having the catalyst-supporting carbon material supporting the catalyst ingredient and the conductivity-aiding carbon material not supporting the catalyst ingredient aggregated as main ingredients and a gas-diffusing carbon material aggregated phase having the gas-diffusing carbon material not supporting the catalyst ingredient aggregated as a main ingredient; and the catalyst (Continued)

aggregated phase is a continuous phase while the gas-diffusing carbon material aggregated phase is dispersed in the catalyst aggregated phase.

5 Claims, 1 Drawing Sheet

(58) Field of Classification Search
USPC .......................................................... 429/534
See application file for complete search history.

(56) References Cited

U.S. PATENT DOCUMENTS

| | | | |
|---|---|---|---|
| 5,846,670 A * | 12/1998 | Watanabe | H01M 4/926 429/530 |
| 5,876,867 A * | 3/1999 | Itoh | B01J 23/56 204/290.14 |
| 2002/0004159 A1* | 1/2002 | Totsuka | H01M 4/86 427/115 |
| 2004/0053112 A1* | 3/2004 | Dolny | B32B 29/00 442/357 |
| 2004/0058214 A1* | 3/2004 | Mehler | H01B 1/24 429/518 |

FOREIGN PATENT DOCUMENTS

| | | |
|---|---|---|
| JP | 2004-071253 | 3/2004 |
| JP | 2004-342505 | 12/2004 |
| JP | 2005-32681 | 2/2005 |
| JP | 2005-174835 | 6/2005 |
| JP | 2006-059634 | 3/2006 |
| JP | 2006-155921 | 6/2006 |

* cited by examiner

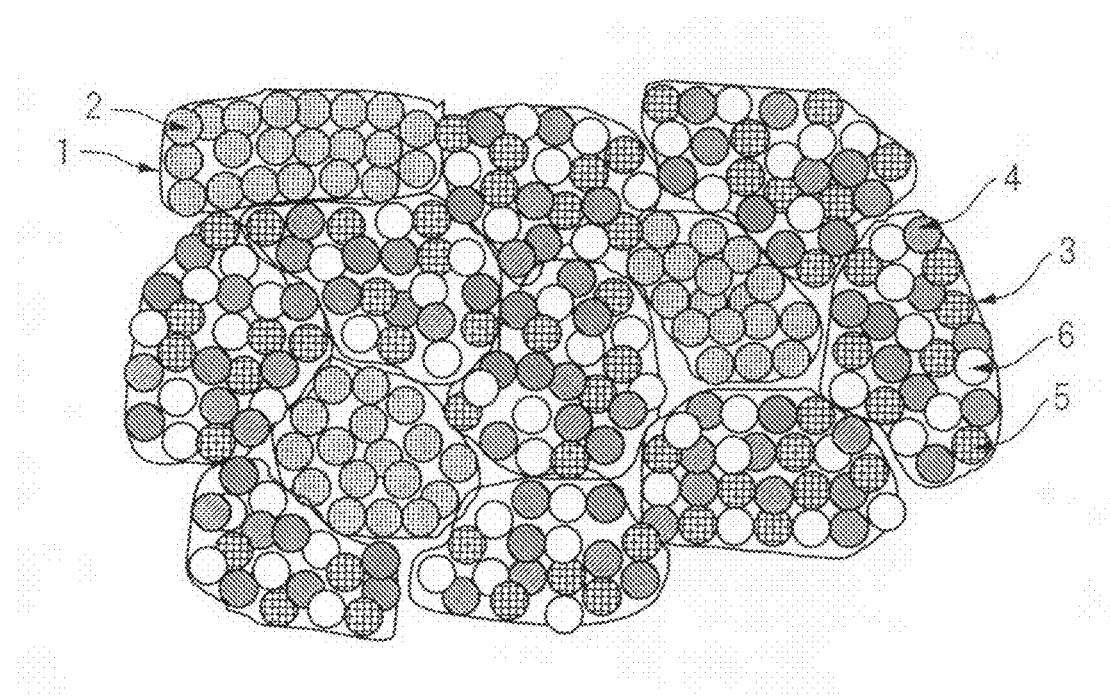

FUEL CELL

This application is a national stage application of International Application No. PCT/JP2009/056838, filed 26 Mar. 2009, which claims priority to Japanese Application No. 2008-094906, filed 1 Apr. 2008, which is incorporated by reference in its entirety.

TECHNICAL FIELD

The present invention relates to a fuel cell, more particular relates to a fuel cell having fuel cell-use gas diffusion electrodes exhibiting high performance even when catalyst layers cannot be sufficiently humidified due to restrictions in the usage environment and when a low humidification operation is forced due to fluctuations in the operating conditions.

BACKGROUND ART

The basic structure of a fuel cell to which the present invention relates, explaining it taking as an example the structure of a general polymer electrolyte membrane fuel cell, is comprised of a proton-conducting electrolyte membrane sandwiched between catalyst layers forming an anode and cathode, further sandwiched at the outside by gas diffusion layers, and furthermore having separators arranged at the outside to thereby form a unit cell. When used as a "fuel cell", usually a plurality of unit cells are stacked in accordance with the required output. To take out current from a fuel cell (each unit cell) having such a basic structure, gas channels at the separators arranged at the two anode and cathode electrodes supply oxygen or air or another oxidizing gas to the cathode side and hydrogen or another reducing gas to the anode side through the respective gas diffusion layers to the catalyst layers. For example, when utilizing hydrogen gas and oxygen gas, the energy difference (potential difference) between the chemical reaction occurring on the catalyst at the anode $[H_2 \rightarrow 2H^+ + 2e^- (E_0 = 0V)]$ and the chemical reaction occurring on the catalyst at the cathode $[O_2 + 4H^+ + 4e^- \rightarrow 2H_2O (E_0 = 1.23V)]$ is utilized to take out current.

Therefore, unless the gas diffusion paths from the gas channels of the separators to the catalysts inside the catalyst layers over which the oxygen gas or hydrogen gas can move, the proton-conducting paths over which protons ($H^+$) generated on the anode catalyst can move through the proton-conducting electrolyte membrane to the catalyst of the cathode, and furthermore the electron-conducting paths over which electrons ($e^-$) generated on the anode catalyst can move through the gas diffusion layer, separator, and external circuits to the cathode catalyst are continuously connected without interruption, current cannot be efficiently taken out.

Inside the catalyst layers, in general, it is important that pores formed at spaces between the materials and forming gas diffusion paths, the electrolyte material forming the proton-conducting paths, and the carbon material or the metal material or other conductive material forming the electron-conducting paths respectively form continuous networks.

Further, for the proton-conducting electrolyte membrane and the proton-conducting paths in the catalyst layers, a polymer electrolyte material comprised of an ion exchange resin such as a perfluorosulfonic acid polymer is used. Such generally used polymer electrolyte materials exhibit high proton conductivity under wet environments and end up dropping in proton conductivity under dry environments. Therefore, to make fuel cells operate efficiently, the polymer electrolyte material must be in a sufficiently wet state. In addition to the gases supplied to the two electrodes, steam must be constantly supplied.

To supply steam, in general the method of running the supplied gases through water warmed in advance to a certain temperature so as to humidify them or the method of directly supplying water warmed to a certain temperature to the cells has been used. A humidifier becomes necessary separate from the cells. However, for the purpose of setting the energy efficiency of the system as a whole high, it is preferable that there be no humidifier consuming energy for warming the water. If there is one, it is preferable that it consume the minimum required amount of energy. Further, for the purpose of making the system as a whole light and smaller, similarly it is preferable that there be no humidifier. If there is one, it is preferable that it be the minimum required size. Therefore, depending on the purpose of use of the fuel cell, sometimes a sufficient humidifier cannot be mounted in the system and the electrolyte material cannot be humidified. Further, even when a humidifier provided with a sufficient humidifying ability for steady state operation is mounted, a low humidified state will unavoidably be fallen into temporarily at the time of startup or at the time of fluctuations in load.

In this way, it is not always possible to use the fuel cell in a wet environment suitable for the electrolyte material, so there are strong demands for fuel cell-use catalyst layers which can exhibit a high performance even under such low humidifying conditions. A high performance fuel cell provided with such catalyst layers and easy to control and operate is therefore desired.

For this reason, in the past, methods have been proposed of using ingredients having hydrophilicity for the gas diffusion layers or catalyst layers or for the intermediate layers arranged between the gas diffusion layers and catalyst layers so as to humidify the electrolyte membrane or the electrolytic materials inside the catalyst layers.

Among these, as a proposal for imparting hydrophilicity to the catalyst layers, Japanese Patent Publication (A) No. 2004-342505 discloses to maintain high cell performance even when reducing the amount of humidification by introducing, for the anode, a catalyst ingredient in the zeolite or titania or other hydrophilic particles or hydrophilic supporting materials.

Japanese Patent Publication (A) No. 2006-59634 discloses a fuel cell exhibiting superior startup characteristics even under a low temperature atmosphere in which the anode catalyst layer has a moisture retention agent comprised of a hydrophilically treated conductive material (hydrophilically treated carbon black etc.) introduced into it.

Japanese Patent Publication (A) No. 2005-174835 discloses, for the purpose of providing a fuel cell able to handle a broad range of humidification conditions, the inclusion of for example hydrophilic particles supporting hydrophobic particles such as "silica particles supporting Teflon® particles" into the catalyst layers.

Japanese Patent Publication (A) No. 2006-155921 proposes a fuel cell using activated carbon as the catalyst supporting material wherein the surface area $S_{BET}$ of the activated carbon by the BET method (Brunauer Emmett Teller specific surface area method) satisfies $S_{BET} \geq 1500$ m$^2$/g and the ratio of the surface area $S_{micro}$ (m$^2$/g) of micropores having a diameter of 2 nm or less to the total pore area $S_{total}$(m$^2$/g) satisfies $S_{micro}/S_{total} \geq 0.5$.

Japanese Patent Publication (A) No. 2004-71253 proposes a fuel cell using a supporting material comprised of a carbon material partially including mesoporous carbon particles as the catalyst supporting material.

DISCLOSURE OF INVENTION

However, the above prior arts still have the following problems.

In Japanese Patent Publication (A) No. 2004-342505 and Japanese Patent Publication (A) No. 2005-174835, since a material which is hydrophilic, but does not have electron conductivity or proton conductivity is included in the catalyst layers, there was the problem that the movement paths of the electrons and protons ended up being interrupted and the internal resistance increased.

In Japanese Patent Publication (A) No. 2006-59634, as an example of the hydrophilically treated conductive material, carbon black treated by nitric acid is used as the catalyst supporting material, but the degree of hydrophilicity (degree of hydrophilic treatment) is not described or suggested. According to studies of the inventors, by just including hydrophilically treated carbon black, a superior moisture retention ability is exhibited under low humidity conditions, but it became clear that the problem arises that, when fully humidified, the gas diffusion paths are clogged by the condensed water. That is, depending on the degree of hydrophilicity, the moisture retention ability will be insufficient or the moisture retention ability will become too strong and when reaching conditions of full humidification, the gas diffusion paths will be clogged by water.

The inventors divided the carbon material forming the main ingredient of the catalyst layers into carbon material supporting a catalyst ingredient (below, "catalyst-supporting carbon material") and carbon material not supporting a catalyst ingredient (below, "gas-diffusing carbon material") for inclusion in the catalyst layers, used for the gas-diffusing carbon material at least two types of carbon materials differing in hydration property (hydration force), and thus developed a fuel cell-use catalyst layer maintaining the electrolyte material in the catalyst layer constantly at a suitable wet state under low humidification conditions and free from clogging by condensed water even under high humidification conditions and thereby proposed a fuel cell exhibiting high performance under all humidification conditions.

However, the moisture retaining part is the gas-diffusing carbon material not supporting any catalyst, so this was not necessarily sufficient in the point of the moisture retention effect of the electrolyte material near the catalyst. Furthermore, new improvements were necessary for achieving higher characteristics.

Japanese Patent Publication (A) No. 2006-155921 proposes using activated carbon as a supporting material. The result is sufficient in terms of moisture retention near the catalyst particles and movement of the gas is secured by the gas-diffusing carbon material as well. However, if aiming at a higher performance fuel cell, there were the problems that the electron conductivity of activated carbon itself is low, that while the hydrophilicity around the catalyst particles is high, movement of gas very close to the catalyst is inhibited, etc.

Japanese Patent Publication (A) No. 2004-71253 proposed using mesoporous carbon as part of the catalyst supporting material. By mixing with a carbon material other than mesoporous carbon as the catalyst supporting material, the gas diffusivity and electron conductivity were improved over use of mesoporous carbon alone. However, for example, at the time of high load operation under high humidification conditions, the water produced tends strongly to clog the gas paths. If avoiding this by lowering the ratio of the mesoporous carbon, in particular at the time of low load operation under low humidification conditions, the electrolyte near the catalyst on the carbon material other than the mesoporous carbon will easily become dry, so with a certain specific mixing ratio, good properties can only be exhibited under limited conditions. In particular, the carbon material other than the mesoporous carbon is expected to function to increase the diffusivity of the reaction gas, but the carbon material other than the mesoporous carbon also has catalyst particles, so in particular with use of the cathode at the time of high load operation, the water produced at the catalyst particles tends to obstruct diffusion of the gas. The catalyst layer could not serve as an all mighty one under all conditions.

Therefore, the present invention has as its object the provision of a fuel cell having fuel cell-use catalyst layers wherein paths of movement of gases, electrons, and protons can be formed in the catalyst layers used for the fuel cell without interruption, the electrolyte materials in the catalyst layers can be constantly maintained in a suitable wet state under low humidification conditions, and the gas diffusion paths will not be clogged by condensed water even under high humidification conditions, that is, a fuel cell exhibiting high performance regardless of the humidification conditions.

To solve the above problems, the inventors took note of the moisture retention ability of the catalyst layers used for fuel cells. They studied advanced structures of the catalyst ingredients, electrolyte materials, and carbon materials and as a result discovered a catalyst layer structure where the catalyst supported on the catalyst supporting material can sufficiently function under all sorts of conditions. They were able to secure superior gas diffusion paths and thereby completed the present invention. The discoveries relating to the catalyst structure were as follows:

They discovered that by dividing the carbon material forming the ingredient of the catalyst layers into "a catalyst-supporting carbon material" supporting the catalyst ingredient, "a gas-diffusing carbon material" not supporting the catalyst ingredient, and "a conductivity-aiding carbon material" not supporting the catalyst ingredient for inclusion in the catalyst layers, forming a structure comprised of two aggregated phases of "a catalyst aggregated phase" formed by making the catalyst ingredient in the catalyst layers, the catalyst-supporting carbon material, the conductivity-aiding carbon material, and the electrolyte material aggregate and "a gas-diffusing carbon material aggregated phase" formed by making the gas-diffusing carbon material aggregate, making a structure comprised of the catalyst aggregated phase as a continuous phase (matrix) and the gas-diffusing carbon material aggregated phase dispersed in the same, the superior function of a high performance exhibited without regard as to the humidification conditions is realized.

By structuring the catalyst layers in this way, the electrolyte material becomes present near the catalyst carbon material and a drop in moisture content under dry conditions is prevented. By making the electrolyte material a continuous phase, the proton-conducting paths, that is, the network of the electrolyte material, are made to develop further and the rise in internal resistance due to proton conductivity is prevented.

Further, the conductivity-aiding carbon material also becomes arranged near the catalyst-supporting carbon material, aids the necessary electron transfer at the catalyst, and prevents the rise in the internal resistance due to the electron transfer. Further, by not causing the conductivity-aiding carbon material to support a catalyst, the effect is obtained of preventing the water produced on the catalyst ingredient from clogging the gas diffusion paths.

Furthermore, as explained above, by causing the gas-diffusing carbon material aggregated phase to disperse in the continuous phase of the catalyst aggregated phase, the gas diffusion paths are secured. The gas-diffusing carbon material aggregated phase does not contain any catalyst ingredient, so at the time of power generation, water is not produced in the gas-diffusing carbon material aggregated phase and therefore it is possible to more effectively secure the gas diffusion paths. Further, a fluorinated compound not having electron conductivity is not used for the gas-diffusing carbon material aggregated phase, so the gas diffusion paths can be secured without interruption of the electron-conducting paths.

Further, the gas-diffusing carbon material aggregated phase is an independent aggregated phase not containing any electrolytic substance or catalyst ingredient, so by using a carbon material with a low steam adsorption characteristic for the gas-diffusing carbon material forming the aggregated phase, it is possible to make use of the hydrophobic characteristic inherently possessed by the carbon material surface, so the gas diffusion paths can be secured more efficiently.

Furthermore, the inventors discovered that if giving the catalyst-supporting carbon material a fine porous structure easily retaining water, it is possible to maintain the power generating performance under a broad range of conditions. That is, under high humidification conditions and high load operation or other wet conditions, if water is produced due to the humidification and power generation at the catalyst layers, this water causes steam to be excessively present at the catalyst layers. The danger rises of this steam condensing to block the gas diffusion paths of the catalyst layer and causing the power generation performance to excessively drop, but if including the gas-diffusing carbon material not supporting a catalyst ingredient in the catalyst layers, the gas diffusion paths can be easily secured even under the above such wet conditions and stable power generation performance can be easily obtained.

Conversely, under low humidification conditions and low load operation or other dry conditions, there is little steam supplied to the catalyst layers and the water produced due to the power generation is small as well, so the electrolyte material is easily dried. To cause high proton conductivity at generally used electrolyte materials, the presence of water is essential, but under such dry conditions, the moisture content of the electrolyte material falls and the proton conductivity sharply drops, so the internal resistance at the time of power generation rises and the power generation performance deteriorates.

However, if giving the catalyst-supporting carbon material a fine porous structure easily retaining water, the water excessively produced at the time of high load operation etc. can be stored in the catalyst-supporting carbon material, so it is possible to prevent a drop in moisture content of the electrolyte material in the catalyst layers and effectively suppress a rise in the internal resistance, therefore possible to prevent deterioration of the cell performance.

Further, a carbon material having a fine porous structure easily retaining water often is generally inferior in electron conductivity. For this reason, if including a carbon material superior in electron conductivity in the catalyst-layers as a conductivity-aiding carbon material, it is possible to prevent a rise in internal resistance due to the electron conductivity.

In the above way, the inventors discovered that by dividing the carbon material used in the catalyst layers by function sought into a plurality of carbon materials and forming an aggregated phase structure so that the catalyst ingredient, electrolyte material, and carbon materials can efficiently act in the catalyst layers, a fuel cell can be obtained which can stably and efficiently generate power even under an unparalleled broad range of conditions and thereby reached the present invention. Further, it has as its gist the following.

(1) A fuel cell comprised of a proton-conducting electrolyte membrane sandwiched between a pair of catalyst layers, wherein a catalyst layer of at least a cathode contains a catalyst ingredient, electrolyte material, and carbon material, the carbon material is comprised of three types of materials of a catalyst-supporting carbon material supporting the catalyst ingredient, a conductivity-aiding carbon material not supporting the catalyst ingredient, and a gas-diffusing carbon material not supporting the catalyst ingredient, the catalyst layer is comprised of two phases of a catalyst aggregated phase having the catalyst-supporting carbon material supporting the catalyst ingredient and the conductivity-aiding carbon material not supporting the catalyst ingredient aggregated as main ingredients and a gas-diffusing carbon material aggregated phase having the gas-diffusing carbon material not supporting the catalyst ingredient aggregated as a main ingredient, and the catalyst aggregated phase is a continuous phase while the gas-diffusing carbon material aggregated phase is dispersed in the catalyst aggregated phase.

(2) A fuel cell as set forth in (1), wherein the catalyst-supporting carbon material of the catalyst layer has a specific surface area $S_{BET}$ by BET evaluation of 1000 $m^2/g$ to 4000 $m^2/g$ and a ratio $S_{micro}/S_{total}$ of a micropore surface area $S_{micro}$ of micropores of a diameter of 2 nm or less by t-plot analysis and total surface area $S_{total}$ of 0.5 or more.

(3) A fuel cell as set forth in (1), wherein the conductivity-aiding carbon material of the catalyst layer has a ratio $X/S_{BET}$ of DBP oil absorption X (mL/100 g) and specific surface area $S_{BET}$ ($m^2/g$) by BET evaluation of 0.2 to 3.0.

(4) A fuel cell as set forth in (1), wherein the gas-diffusing carbon material of the catalyst layer has a ratio $X/S_{BET}$ of DBP oil absorption X (mL/100 g) and specific surface area $S_{BET}$ ($m^2/g$) by BET evaluation of 1.0 or more.

(5) A fuel cell as set forth in any one of (1) to (4) wherein in a field of an area of 10 μm×10 μm at a cross-section of the catalyst layer, there is at least one gas-diffusing carbon material aggregated phase not supporting a catalyst ingredient of a circle equivalent diameter of 300 nm or more.

The present invention gives the following effects.

The fuel cell of the present invention can form paths of gases, electrons, and protons in the catalyst layers without interruption, maintain the electrolyte materials in the catalyst layers constantly at suitably wet states under low humidification conditions, and prevent clogging of the gas diffusion paths by condensed water even under high humidification conditions to thereby realize high performance without regard to the humidification conditions.

Therefore, according to the fuel cell of the present invention, management of the moisture (humidity) of the fuel cell becomes easy, so system control and operation become simple.

BRIEF DESCRIPTION OF DRAWINGS

FIG. 1 is a schematic view for explaining the aggregated phase structure of the catalyst layer of the present invention.

However, to facilitate viewing as a schematic view, the relative sizes of the different layer structures differ from the actual ones.

BEST MODE FOR CARRYING OUT THE INVENTION

The fuel cell of the present invention is a fuel cell comprised of a proton-conducting electrolyte membrane sandwiched between a pair of catalyst layers.

Each catalyst layer included in the fuel cell of the present invention is comprised of a mixture including a catalyst ingredient, a carbon material, and electrolyte material. The carbon material is comprised of a catalyst-supporting carbon material supporting a catalyst ingredient, a gas-diffusing carbon material not supporting a catalyst ingredient, and a conductivity-aiding carbon material not supporting a catalyst ingredient. Furthermore, the catalyst layer of the present invention has a two-aggregated phase structure of "a catalyst aggregated phase" formed by the catalyst-supporting carbon material, the electrolyte material, and the conductivity-aiding carbon material as main ingredients aggregated together and "a gas-diffusing carbon material aggregated phase" formed by a gas-diffusing carbon material as a main ingredient aggregated together, the catalyst aggregated phase is a continuous body, and the gas-diffusing carbon material aggregated phase is dispersed in the catalyst aggregated phase. Due to this, the properties are strikingly improved compared with a catalyst layer in which the ingredients are simply averagely mixed.

FIG. 1 schematically shows the structure of the catalyst layer according to the present invention. Note that, in this FIG. 1, to schematically clearly express the materials and aggregated phases, the relative sizes of the different layer structures are different from the actual sizes.

The "aggregation" in the present invention is the state of the primary particles gathered together by Van de Waals' force, Coulomb's force, or other interparticle force. When the catalyst layer is formed by an aggregate of a state of the primary particles aggregated together, each of the aggregates in this catalyst layer may be referred to by the "aggregated phase".

The ingredients of the present invention have their respectively sought functions. To realize these functions, these respectively have to have the minimum properties of the substances. If a catalyst ingredient, it is required to be provided with the function of a catalyst, while if an electrolyte material, it is required to be provided with the function of conducting protons. In particular, the three carbon materials having respectively assigned functions is a feature of the present invention.

First, the gas-diffusing carbon material is assigned the function of efficiently diffusing the gas. For this reason, in the catalyst layer of the present invention, the particles of the gas-diffusing carbon material are aggregated so as to continuously link the spaces between the primary particles formed by the structure of the gas-diffusing carbon material. These are formed as gas diffusion paths in the catalyst layer to make the gas-diffusing carbon material effectively function. Further, to make this function more effective, the catalyst ingredient and electrolyte material are prevented from contacting the surface of the gas-diffusing carbon material as much as possible to make maximum use of the surface characteristics of the gas-diffusing carbon material and the representative structure of the same.

Second, the catalyst-supporting carbon material is assigned the function of storing water in addition to the function of supporting the catalyst ingredient. In the catalyst layer of the present invention, the catalyst-supporting carbon material supporting the catalyst ingredient, the electrolyte material, and the conductivity-aiding carbon material not supporting the catalyst ingredient are aggregated to form the catalyst aggregated phase. For this reason, even under dry conditions, the water stored by the catalyst-supporting carbon material can be effectively discharged to the electrolyte material to prevent a drop in the moisture content of the electrolyte material.

Third, the conductivity-aiding carbon material is assigned the function of securing the electron conductivity in the catalyst layer. Even when using a catalyst-supporting carbon material able to easily store water, but inferior in electron conductivity, the electron conductivity can be complemented by the conductivity-aiding carbon material.

The catalyst aggregated phase in the catalyst layer of the present invention is strongly aggregated through the electrolyte material, whereby the mechanical strength of the catalyst layer itself is secured. The electrolyte material continuously contacts itself to form a network and can reduce the internal resistance in the catalyst layer, that is, the proton conduction resistance.

The catalyst ingredient used in the catalyst layer of the present invention is not limited so long as the reaction sought proceeds on the catalyst ingredient. As preferable examples of the catalyst ingredient, platinum, palladium, ruthenium, gold, rhodium, osmium, iridium, or other precious metals, composites or alloys of two or more types of these precious metals, complexes of precious metals with organic compounds or inorganic compounds, transition metals, composites or alloys of transition metals together or transition metals with precious metals, complexes of precious metals or transition metals with organic compounds or inorganic compounds, metal oxides, etc. may be mentioned. Further, it is possible to use two or more of these types together.

The catalyst-supporting carbon material among the carbon materials used in the present invention has the function of supporting the catalyst ingredient and also the function of storing water of an extent enabling humidification of the nearby electrolyte material. Due to this, a stable power generation performance is obtained even in a dry state.

Further, to obtain this function more effectively, the specific surface area $S_{BET}$ by the BET evaluation method is more preferably 1000 m$^2$/g to 4000 m$^2$/g and the ratio $S_{micro}/S_{total}$ of the surface area $S_{micro}$ of micropores of a diameter of 2 nm or less found by t-plot analysis to the total surface area $S_{total}$ is more preferably 0.5 or more. Here, the specific surface area $S_{BET}$ is the value of the specific surface area found by the BET method from measurement of the adsorption isotherm of nitrogen gas at the liquid nitrogen temperature. If this catalyst-supporting carbon material has a specific surface area $S_{BET}$ of 1000 m$^2$/g to 4000 m$^2$/g, not only can it easily support the catalyst ingredient, but also it can easily store water under wet conditions and further can gradually release the stored water under dry conditions to thereby prevent a drop in the moisture content of the electrolyte material present nearby. For this reason, it is possible to suppress a drop in the proton conductivity of the electrolyte material. If the specific surface area $S_{BET}$ is less than 1000 m$^2$/g, the amount of water which the catalyst-supporting carbon material can hold becomes smaller in some cases and under low humidification conditions or low load operation or other such dry conditions, the moisture content of the electrolytic substance in the catalyst layer falls and the internal resistance due to the proton conductivity easily rises. Further, the upper limit of the specific surface area $S_{BET}$ is not particularly set, but the specific surface area of the actually usable carbon material is 4000 m²/g or less.

Further, relating to the catalyst-supporting carbon material, as explained above, if the ratio $S_{micro}/S_{total}$ of the surface area $S_{micro}$ of the micropores of a diameter of 2 nm or less found by t-plot analysis to the total surface area $S_{total}$ is 0.5 or more, the power generation performance under substantially dry conditions is further improved. Here, the specific surface area $S_{micro}$ of the micropores and the total surface area $S_{total}$ are calculated from the adsorption isotherm of nitrogen gas at the liquid nitrogen temperature. Values calculated by t-plot analysis (Chemical Society of Japan ed., "Colloid Chemistry I", Tokyo Kagaku Dojin, 1995) were used.

The detailed mechanism is unclear, but micropores, defined as pores having a diameter of 2 nm or less, have the property of easily storing water under wet conditions in the operating environment of a fuel cell and suitably releasing the stored water under dry conditions. In particular, if the specific surface area $S_{BET}$ is 1000 m²/g to 4000 m²/g and $S_{micro}/S_{total}$ is 0.5 or more, the ease of supporting the catalyst ingredient is improved, the amount of water which the catalyst-supporting carbon material can hold and the absorption/release properties of the water are balanced well, and stable power generation characteristics can be obtained both under wet conditions and under dry conditions. $S_{micro}$ can never become larger than $S_{total}$, so the upper limit of $S_{micro}/S_{total}$ is 1. If $S_{micro}/S_{total}$ becomes less than 0.5, power generation performance under substantially dry conditions falls and sufficient properties often cannot be obtained.

The catalyst-supporting carbon material used in the present invention is not particularly limited so long as a generally existing carbon material, but as explained above, a carbon material with a specific surface area $S_{BET}$ of 1000 m²/g to 4000 m²/g and an $S_{micro}/S_{total}$ of 0.5 or more can be used as a preferable carbon material. In particular, a material which will cause a chemical reaction other than the inherently sought reaction or where contact with condensed water will result in the substance forming the carbon material leaching out is not preferable. A chemically stable carbon material is preferable. As such a carbon material, carbon black, graphite, carbon fiber, activated carbon, etc. or crushed products of these, carbon nanofibers, carbon nanotubes, or other carbon compounds etc. may be used. Two or more of types of these carbon materials may also be used mixed together.

As the most preferable example of a carbon material, activated carbon having a large specific surface area, a diameter of 2 nm or less, and a large micropore surface area may be mentioned. In general, activated carbon, depending on its method of production, may have oxygen introduced into its porous surface in various chemical forms (forms of oxygen-containing functional groups). The types of the oxygen-containing functional groups are not particularly limited, but if illustrated include carboxyl groups, hydroxyl groups, quinone type oxygen, lactone rings, ring shaped ethers, etc.

The inventors engaged in in-depth studies and as a result learned that if the oxygen content is too great, when used for a long time in the catalyst layers of a fuel cell, the catalyst-supporting carbon material itself will be consumed by oxidation which will easily lead to a drop in the power generation performance. For this reason, the optimum range of oxygen content is 1 mass % to 5 mass %. If the oxygen content of the activated carbon is over 5 mass %, the catalyst-supporting carbon material will be easily consumed by oxidation under the fuel cell operating environment and the lifetime of the catalyst will fall, so this material cannot be applied to the present invention in some cases. If less than 1 mass %, the amount of moisture retention will substantively be insufficient in some cases and the properties under dry conditions will deteriorate, so this is not preferable in some cases as well.

The preferable content of the catalyst-supporting carbon material in the catalyst layers is influenced by the type and content of the catalyst-supporting carbon material and gas-diffusing carbon material and the type and supporting rate of the catalyst ingredient, so cannot be specified. However, if in a range of 5 mass % to 80 mass %, at least the functions of the fuel cell can be exhibited and the effects of the present invention can be obtained. If outside this range, the balance with other ingredients becomes poor and an efficient fuel cell cannot be obtained in some cases. For example, if less than 5 mass %, the amount of the catalyst ingredient supported on the catalyst-supporting carbon material becomes too small and sufficient performance cannot be exhibited in some cases. Further, for example, if over 80 mass %, the amount of the electrolyte material becomes too small and the proton-conducting paths become poorer, so again an efficient cell cannot be obtained in some cases. If illustrating a more preferable range, it is 10 mass % to 60 mass %.

Furthermore, if selecting as the catalyst-supporting carbon material having a steam adsorption at 25° C. and a relative humidity of 90% of 500 mL/g or more, the electrolyte near the catalyst ingredient can be kept in a suitable wet state and a drop in the proton conductivity can be prevented, so even at the time of low current discharge where not much water will be produced on the catalyst ingredient of the cathode, the protons conduction resistance will not rise and the fuel cell can be kept in a more preferable state.

Therefore, the catalyst-supporting carbon material of the present invention should be easily wettable by water. The upper limit of the preferable range of the amount of steam adsorption at 25° C. and a relative humidity of 90% cannot be set. Even if illustrating a substantive upper limit of the amount of steam adsorption at 25° C. and a relative humidity of 90%, the limit would be 2000 mL/g or so estimated as being obtained by activated carbon with a high specific surface area. If the amount of steam adsorption of the catalyst-supporting carbon material at a relative humidity of 90% is lower than 500 mL/g, the electrolyte near the catalyst ingredient would easily dry under dry conditions and the proton conductivity would easily fall, so this would not be preferable in some cases.

The hydration property (hydration force) of the carbon material is the interaction between water molecules, mainly the electrostatic interaction between the electric dipoles of the water molecules and charges of the medium and the strength of the hydrogen bonds etc. The hydration force can be judged by the amount of steam adsorption under fixed conditions. In the present invention, the amount of steam adsorption at 25° C. and a relative humidity of 90% showing the hydration force of the carbon material is shown converting the amount of steam adsorbed per 1 g of carbon material placed in a 25° C. environment converted to the volume of steam in a standard state. The amount of steam adsorption of 25° C. and a relative humidity of 90% can be measured using a commercially available steam adsorption measuring apparatus. Alternatively, the amount of steam adsorption of 25° C. and a relative humidity of 90% can be measured for change in mass of a dried gas-diffusing carbon material in a constant temperature, constant humidity tank of 25° C. and a relative humidity of 90% for a sufficient time.

Further, the primary particle size of the catalyst-supporting carbon material is more preferably 10 nm to 5 µm. Carbon material larger than this range can be crushed for use. Crushing is preferable. If the primary particle size is over 5 µm, the possibility of the gas diffusion paths and proton-conducting paths being interrupted becomes higher. In addition, in particular, due to economic reasons, if limitation of the amount of the catalyst ingredient force a catalyst layer to perform at a thickness of about 10 µm, the distribution of the catalyst-supporting carbon material larger than 5 µm at the catalyst layer easily becomes uneven. This is unpreferable in some cases. Further, if the primary particle size is less than 10 nm, the electron conductivity becomes lower and unpreferable in some cases, and a carbon material with an $S_{micro}/S_{total}$ of 0.5 or more can substantially no longer be obtained in some cases.

The type of the carbon material used for the conductivity-aiding carbon material of the present invention is not particularly limited so long as a generally existing carbon material having electron conductivity. However, a material which will cause a chemical reaction other than the inherently sought reaction or where contact with condensed water will result in the substance forming the carbon material leaching out is not preferable. A chemically stable carbon material is preferable. Further, the primary particle size of the carbon material is more preferably 5 nm to 1 µm. A carbon material larger than this range may be crushed for use. If the primary particle size is over 1 µm, the distribution of the conductivity-aiding carbon material in the catalyst layer is liable to become uneven. This is undesirable in some cases.

Further, if the primary particle size is less than 5 nm, the electron conductivity falls. This is not preferable in some cases. As the preferable conductivity-aiding carbon material, carbon black is most general. In addition, if having electron conductivity, graphite, carbon fiber, activated carbon, and crushed products of these, carbon nanofibers, carbon nanotubes, and other carbon compounds etc. may be used. Further, two or more types of carbon materials among these may be used mixed. Among these as well, the conductivity-aiding carbon material is more preferably one having an electron conductivity rate of at least the electron conductivity rate of the catalyst-supporting carbon material (conductivity-aiding carbon material≥catalyst-supporting carbon material).

As the conductivity-aiding carbon material of the present invention, a carbon material with a somewhat developed structure is preferably used. An example of a preferable material is carbon black. Carbon black forms a three-dimensional structure of primary particles melt bonded together. Depending on the type, this structure grows and becomes a structure where the links between the primary particles encompass spaces. If using as the conductivity-aiding carbon material a carbon material having such a structure, the encompassed spaces form gas diffusion paths or water movement paths, so this is preferred.

The extent of the structure can be determined by the method of observation by an electron microscope, but can also be judged by the relationship of the DBP oil absorption and specific surface area. The "DBP oil absorption" is the amount of dibutyl phthalate absorbed by carbon black when bringing dibutyl phthalate into contact with a unit mass of carbon black. The carbon black is mainly absorbed in the spaces between the primary particles, so if the structure is well developed, the DBP oil absorption tends to become greater, while if the structure is not that well developed, the DBP oil absorption tends to become smaller. However, DBP is also absorbed in the micropores formed inside the primary particles in addition to the spaces between the primary particles, so the DBP oil absorption does not always express the extent of development of the structure as it is. If the specific surface area such as measured by the nitrogen adsorption becomes larger, the amount of DBP absorbed in the micropores will become greater and the overall DBP oil absorption will also become greater. Therefore, in highly developed structure carbon black, the DBP oil absorption becomes greater proportional to the nitrogen adsorption, while conversely in low developed structure carbon black, the DBP oil absorption becomes smaller proportional to the nitrogen adsorption.

If using as the conductivity-aiding carbon material a carbon material with a ratio $X/S_{BET}$ of the DBP oil absorption X (ml/100 g) and BET evaluated specific surface area $S_{BET}$ (m$^2$/g) of 0.2 to 3.0, the conducting paths can be secured while the gas diffusion paths and water movement paths can be secured, so a higher performance catalyst layer can be obtained, so this is preferable. If the ratio of $X/S_{BET}$ is less than 0.2, the spaces used as the gas diffusion paths become poorer and extraction of stable catalyst layer performance becomes difficult in some cases. If over 3.0, the conductivity is impaired, so this is not preferable in some cases.

The content of the conductivity-aiding carbon material of the present invention in the catalyst layer is preferably within a range of 3 mass % to 30 mass %. If in this range, even if the electron conductivity of the catalyst-supporting carbon material itself is inferior, the conductivity-aiding carbon material can effectively collect current from the catalyst ingredient. If less than 3 mass %, the current collection effect becomes lower in some cases. If 30 mass % or more, the density of the catalyst ingredient in the catalyst layer ends up falling too much. In particular, when using air as the cathode gas, the polarization of concentration sometimes becomes greater. This is not preferred in some cases.

Further, if the mass of the conductivity-aiding carbon material is in a range of 0.05 to 0.4 with respect to the mass of the catalyst-supporting carbon material as "1", it is more preferable. If in this range, the difference between the power generating characteristics under wet conditions and the power generating characteristics under dry conditions becomes smaller and stable characteristics not governed by these conditions can be exhibited. If less than 0.05, at the time of high load operation, the performance sometimes falls. If over 0.4, the density of the catalyst ingredient in the catalyst layer will fall too much. In particular, when using air as the cathode gas, the polarization of concentration may become greater. This is not preferable in some cases.

The optimum range of the oxygen content of the conductivity-aiding carbon material of the present invention is 5 mass % or less, more preferably 3 mass % or less. If the oxygen content of the conductivity-aiding carbon material is over 5 mass %, the current collecting effect of the conductivity-aiding carbon material falls, so the advantageous effect of using the conductivity-aiding carbon material can no longer be obtained. There is no particular lower limit of the oxygen content. Good characteristics are exhibited even without almost any oxygen being contained.

Regarding the type of the carbon material used for the gas-diffusing carbon material of the present invention, a material which would cause a chemical reaction other than the inherently sought reaction or which, due to contact with condensed water, would result in the substances forming the carbon material leaching out is not preferable. A chemically stable carbon material is preferable.

Further, the gas-diffusing carbon material preferably has a primary particle size of 1 μm to 5 nm. Carbon material larger than this range can be crushed for use. If the primary particle size is over 1 μm, the function of securing the gas diffusion paths can no longer be expected. Not only that, the distribution of the gas-diffusing carbon material in the catalyst layer will become uneven which is not preferred. If the primary particle size is less than 5 nm, preferable gas diffusion paths cannot be obtained in some cases.

As a preferable gas-diffusing carbon material, carbon black is most general. In addition, if gas diffusion paths can be formed, graphite, carbon fibers, activated carbon, etc. and their crushed products, carbon nanofibers, carbon nanotubes, and other carbon compounds etc. can be used. Further, two or more types of these may be used mixed.

Furthermore, in the present invention, particles of the gas-diffusing carbon material are aggregated and made present in the catalyst layer as aggregated phases. The gas diffusion paths formed by the aggregated phases are resistant to crushing even when the cell is strongly fastened, so the optimum pore size controlled to at the time of formation of the catalyst layer is easily held over a long period of time.

Further, the gas-diffusing carbon material of the present invention is more preferably selected from among carbon materials having a small hydration force. By including a carbon material with a small hydration force even without a catalyst ingredient being supported, that is, a gas-diffusing carbon material, in the catalyst layer, it is possible to form paths in the catalyst layer where the gas can diffuse. In the case of the anode, hydrogen or a mixed gas mainly comprised of hydrogen can easily diffuse in the catalyst layer, while in the case of the cathode, oxygen or air etc. can easily diffuse in the catalyst layer, thereby enabling contact with many catalyst surfaces.

Therefore, the reaction at the catalyst layer is efficiently promoted and a high cell performance is obtained. If selecting as the gas-diffusing carbon material a carbon material with a small hydration force, when the catalyst layer is exposed to high humidification conditions due to fluctuations in the operating conditions or when a large amount of water is produced in the catalyst layer due to operation in a high current density region, clogging of the gas diffusion paths due to water can be prevented and a drop in the cell performance can be prevented.

Therefore, if a small hydration force of a steam adsorption at 25° C. and a relative humidity of 90% of the gas-diffusing carbon material contained in the fuel cell of the present invention of 50 mL/g or less, it is possible to effectively suppress clogging of the gas diffusion paths by water produced at the time of large current discharge and possible to take out current by a stable voltage. If over 50 mL/g, at the time of current discharge, condensed water accumulates in the catalyst layer, the gas diffusion paths are easily interrupted, and the voltage behavior becomes unstable in some cases.

Furthermore, to obtain a high effect, a carbon material with a hydration force in a further suitable range is used as the gas-diffusing carbon material. Specifically, a carbon material with a steam adsorption at 25° C. and a relative humidity of 90% of 1 mL/g to 20 mL/g is selected as the gas-diffusing carbon material. In this range, it is possible to suppress excessive drying of the electrolyte material in the catalyst layer. Even at the time of large current discharge, the water produced inside the catalyst layer can be efficiently discharged outside of the catalyst layer and the gas diffusion paths can be secured, so a fuel cell efficient over the entire range of a low load to a high load, that is, without regard as to the load conditions, can be obtained.

If the steam adsorption at 25° C. and a relative humidity of 90% is less than 1 mL/g, the hydration force becomes too small (the hydrophobicity becomes too strong) and excessive drying is sometimes induced. If the steam adsorption at 25° C. and a relative humidity of 90% is over 20 mL/g, when continuously taking out a large current etc., the water produced inside the catalyst layer cannot be discharged fast enough and the gas diffusion paths end up being interrupted in some cases. In such a case, the effect of addition of the gas-diffusing carbon material becomes lower.

The gas-diffusing carbon material of the present invention is preferably one using a highly developed structure carbon black. The carbon black forms a three-dimensional structure of primary particles melt bonded together. Depending on the type, this structure grows and becomes a structure where the links between the primary particles encompass spaces. The spaces surrounded by the network of primary particles of the gas-diffusing carbon material can be continuously linked to secure gas diffusion paths. This is also one aim of its use. Therefore, by using carbon black as the gas-diffusing carbon material, it becomes easier to form the targeted structure in the catalyst layer. Gas diffusion paths formed by the aggregation of carbon black used as a gas-diffusing carbon material are further resistant to crushing even when the cells are strongly fastened, so the optimal pore size controlled to at the time of formation of the catalyst layer can be held over a longer period.

If using for the gas-diffusing carbon material of the present invention a carbon material having a ratio $X/S_{BET}$ of the DBP oil absorption X (ml/100 g) and the specific surface area $S_{BET}$ (m$^2$/g) by BET evaluation of 1.0 or more, a more preferable catalyst layer provided with gas diffusion paths can be formed. If the ratio of $X/S_{BET}$ is 1.0 or more, the spaces formed at the gaps of the primary particles of carbon black in a highly developed structure become large and formation of gas diffusion paths preferable for cell reactions can be expected. If the ratio of $X/S_{BET}$ is less than 1.0, the gas diffusion paths formed by the structure become poorer and the gaps between the secondary particles of the carbon black mainly form the gas diffusion paths, so a sufficient pore size cannot be secured or the pores are easily crushed when fastening the cells, so control is difficult and it is hard to draw out stable performance of the catalyst layer in some cases. More preferably, the ratio of $X/S_{BET}$ is 1.5 or more. If 1.5 or more, the gas diffusion paths formed by the structure can be made sufficiently large in pore size and flooding becomes difficult even when taking out a high current. If such a structure, the gas easily diffuses and clogging of the gas diffusion paths by water becomes harder to occur, so the catalyst in the catalyst layer can be effectively used and a high output fuel cell can be obtained even with a small amount of catalyst.

The content of the gas-diffusing carbon material according to the present invention in the catalyst layer is preferably in the range of 3 mass % to 30 mass %. If less than 3 mass %, the gas diffusion paths cannot be made to sufficiently develop and the effect of inclusion of the gas-diffusing carbon material cannot be expected in some cases. If over 30 mass %, the proton conduction paths are interrupted by the gas-diffusing carbon material and become poor and the proton conduction resistance becomes larger, so the cell performance sometimes falls. If in the range of 3 mass % to 30 mass %, the gaps in the gas-diffusing carbon material form bottlenecks in the catalyst layer. These become gas diffusion paths, so enable the catalyst ingredient in the catalyst layer to be efficiently utilized. If in this range, the optimum gas diffusion paths can be made to develop without harming the proton-conducting paths and electron-conducting paths, so it is possible to obtain electrodes of a fuel cell having extremely efficient power generating characteristics. While depending on the type or form of the carbon material, a range of 5 mass % to 25 mass % is more preferable.

Control of the hydration force of the various types of carbon materials included in the present invention can be achieved by selecting as an indicator the amount of steam absorption from the generally existing carbon materials. Alternatively, even in the case of a carbon material having a steam adsorption smaller than the preferable range, by treating the carbon material surface by an acid, base, etc. or exposing it to an oxidizing atmosphere environment, the steam adsorption can be increased to the preferable range. While not limited to this, for example, it is possible to treat the material in warmed concentrated nitric acid, dip it in a hydrogen peroxide aqueous solution, heat treat it in an ammonia stream, dip it in a warmed sodium hydroxide aqueous solution, heat it in KOH or NaOH, or heat treat it in lean oxygen or lean NO or $NO_2$ so as to increase the steam adsorption. Conversely, when the steam adsorption is too large, by calcining the material under an inert atmosphere, it is possible to reduce the steam adsorption to a suitable range. While not limited to this, for example, it is possible to reduce the steam adsorption by performing heat treatment under an argon, nitrogen, helium, vacuum, or another atmosphere.

The fuel cell of the present invention is one which exhibits its effects regardless of the type of the electrolyte material used. The material is not particularly limited so long as having the function of conduction of protons. The electrolyte material used in the electrolyte membrane or catalyst layers used for the fuel cell of the present invention may be a polymer in which a phosphoric acid group, sulfonic acid group, etc. is introduced. For example, a perfluorosulfonic acid polymer or a polymer in which benzene sulfonic acid is introduced etc. may be mentioned, but the invention is not limited to a polymer. An inorganic type or an inorganic-organic hybrid type or other electrolyte membrane may also be used for the fuel cell. In particular, if illustrating the preferable operating temperature range, a fuel cell which operates in a range of ordinary temperature to 150° C. is preferable.

The mass ratio of the catalyst-supporting carbon material and the electrolyte material contained in each catalyst layer is preferably 1/10 to 5/1. If the catalyst-supporting carbon material is less than 1/10, the catalyst surface ends up being excessively covered by the electrolyte material, and the area by which the reaction gas can contact the catalyst ingredient sometimes becomes smaller. If excessively containing the catalyst-supporting carbon material over 5/1, the network of the electrolyte material becomes poor and the proton conductivity becomes lower in some cases.

The structure of a catalyst layer of the present invention can also be confirmed by observation of its cross-section. By preparing a cut cross-section at any angle at any location of the catalyst layer and observing that cross-section, the formation of aggregates (aggregated phase) by the carbon material in which a catalyst ingredient is not supported can be confirmed. The aggregates correspond to the gas-diffusing carbon material aggregated phase of the present invention.

In the field of an area of 10 μm×10 μm in a cross-section of a catalyst layer, there is preferably at least one carbon material aggregated phase not having any catalyst ingredient of a size of a circle equivalent diameter of 300 nm or more (gas-diffusing carbon material aggregated phase), or in 10 fields, there is an average of at least one per field. If less than one, the various carbon materials end up being mixed uniformly at the time of formation of the catalyst layer or the content of the carbon material not supporting a catalyst ingredient, that is, the gas-diffusing carbon material, was too low, so at least the gas-diffusing carbon material did not form an aggregated phase and disperse, so the catalyst layer ended up with undeveloped gas diffusion paths and poor gas diffusivity and stable performance could not be realized in particular under wet conditions. More preferably, in the same field, there is at least one carbon material aggregated phase not having any catalyst ingredient of a size of a circle equivalent diameter of 500 nm or more (gas-diffusing carbon material aggregated phase) or in 10 fields, there is an average of at least one per field. If such a structure, the power generation performance can be kept from becoming unstable under at least wet conditions and stable power generation performance can be obtained.

The method of formation of a cut cross-section of a catalyst layer is not particularly limited, but, for example, a catalyst layer may be cut by a cutter knife or scissors. Further, the method of cooling the catalyst layer to the glass transition temperature of the electrolytic substance or less, breaking the catalyst layer, and observing its cross-section may also be used. The method of using a cryomicrotome etc. to form a cut cross-section of a catalyst layer under an environment cooled by liquid nitrogen is considered preferable. The method of using a cryomicrotome to prepare and observe ultrathin slices may also be considered, but more simply there is the method of setting a catalyst layer as a sample at a cryomicrotome, using a trimming knife made of diamond or glass to cut the catalyst layer surface, and observing the formed cut surface.

As the method of observation, a scanning electron microscope which enables observation of the same field by both a secondary electron image and a reflected electron image and which enables observation at least 10,000 magnification is preferred. The secondary electron image reflects the shape information of the cross-section of the catalyst layer and enables confirmation of the presence of the carbon material or electrolyte material or the pores. If using a high precision electron microscope, the presence of the catalyst ingredient can be confirmed, but if observing the reflected electron image of the same field, the distribution information of the ingredients is reflected. For example, when using a metal for the catalyst ingredient, the catalyst ingredient is bright, while the locations not the catalyst ingredient are dark in contrast in the image obtained. If comparing the secondary electron image and reflected electron image of a catalyst layer of the present invention, despite the presence of the carbon material in the secondary electron image of the same field, parts of a dark contrast, that is, carbon material with no catalyst ingredient present, can be observed in the reflected electron image. These parts, that is, parts of carbon material not having any catalyst ingredient, have a circle equivalent diameter of the outer circumference of 300 nm or more in a preferred embodiment of the present invention.

An example where the presence of a carbon material aggregated phase not having a catalyst ingredient of a size of a circle equivalent diameter of 300 nm or more (gas-diffusing carbon material aggregated phase) can be identified more quantitatively will be explained next. The reflected electron image was observed at 10,000 magnification and a resolution of 272DPI×272DPI or more and the brightness was fetched at 256 levels. The fetched brightness of the image was digitalized using image analysis is software to display a range from dark to the 110 level by a black color and make the range from the 111 level to the brightest 256th level become white. With just this, there were a large number of black points isolated in island shapes and the target range did not become clear, so to clarify the target range, the black points were processed for expansion once so as to determine the adjoining points. Furthermore, processing was performed to fill in the empty parts in the range to make the range appear uniform. Finally, the expanded parts were returned to their original states by contraction processing to clarify the target range. In addition, the circle equivalent diameters of the black parts were calculated from the areas of the black parts, and parts less than 300 nm were all cut. The presence of carbon material in the remaining black parts in a secondary electron image is a preferred embodiment of the present invention.

In the present invention, it is not necessary to use all of the above analysis methods to observe the carbon material aggregated phase not containing a catalyst ingredient (gas-diffusing carbon material aggregated phase) to determine if the prescribed range of the present invention is satisfied. If the value obtained by even one analysis method satisfies the prescribed range of the present invention, the effect is obtained.

The method of preparation of a catalyst layer included in a fuel cell of the present invention is not particularly limited so long as it can cause the gas-diffusing carbon material aggregated phase to disperse in a continuous phase of the catalyst aggregated phase and can prevent the electrolyte material from being adsorbed at the gas-diffusing carbon material surface as much as possible. Water or an organic solvent may be added in accordance with need to the material forming the catalyst layer so as to prepare an ink. This ink can be dried in a film shape to form a catalyst layer.

Particularly preferable methods of preparation of a catalyst layer will be explained below.

(i) A catalyst-supporting carbon material supporting a catalyst ingredient, a conductivity-aiding carbon material, and an electrolyte material are crushed and mixed in a good solvent for the electrolyte material, then a poor solvent for the electrolyte material is added to cause the electrolyte material and the catalyst-supporting carbon material supporting a catalyst ingredient to aggregate and give a solution A. The gas-diffusing carbon material not supporting a catalyst ingredient is crushed in a poor solvent for the electrolyte material to give a solution B. The solution A and the solution B are mixed to obtain a solution C. This is used as an ink and dried in a film shape to form a catalyst layer.

With this method, if crushing and mixing the catalyst-supporting carbon material supporting a catalyst ingredient and the conductivity-aiding carbon material together with the electrolyte material in a good solvent for the electrolyte material, the catalyst-supporting carbon material is crushed to a fine aggregate, and electrolyte material is present dissolved near the surface. If adding to this a poor solvent for the electrolyte material and causing the electrolyte material to precipitate, the catalyst-supporting carbon material supporting the catalyst, the conductivity-aiding carbon material, and the electrolyte material particles are made to aggregate, and the electrolyte material is fixed in place by the catalyst-supporting carbon material supporting the catalyst and the conductivity-aiding carbon material.

Furthermore, if a fine gas-diffusing carbon material is added to this solution, the electrolyte material is fixed in place by the catalyst-supporting carbon material and the conductivity-aiding carbon material, so the gas-diffusing carbon material surface becomes hard to be covered by the electrolyte material, and the surface properties inherently possessed by the surface of the gas-diffusing carbon material can be utilized. That is, the result becomes the structure of the two aggregated phases of the catalyst aggregated phase and gas-diffusing carbon material aggregated phase of the present invention. The catalyst aggregated phase becomes a continuous body and the gas-diffusing carbon material aggregated phase is dispersed in the catalyst aggregated phase in the structure. This method is effective in particular when using a gas-diffusing carbon material controlled in hydration properties of its surface.

(ii) The catalyst-supporting carbon material supporting a catalyst ingredient and a fine amount of the electrolyte material are crushed and mixed in a good solvent for the electrolyte material, then dried to solidify. To that solid, a poor solvent for the electrolyte material and the conductivity-aiding carbon material are added. The solid is crushed, then furthermore a solution in which the electrolyte material is dissolved is added dropwise to give a solution A. A gas-diffusing carbon material not supporting a catalyst ingredient is crushed in a poor solvent for the electrolyte material to give a solution B. The solution A and the solution B are mixed to obtain a solution C. This is used as an ink and dried in a film shape to form a catalyst layer.

With this method, if crushing and mixing a catalyst-supporting carbon material supporting a catalyst ingredient with a fine amount of an electrolyte material in a good solvent for the electrolyte material, then drying the result, the fine amount of electrolyte material is fixed in a thin layer on the surface of the catalyst-supporting carbon material supporting the catalyst ingredient. If crushing the solid obtained by drying this (catalyst-supporting carbon material on which fine amount of electrolyte material is fixed) in a poor solvent for the electrolyte material together with the conductivity-aiding carbon material, the electrolyte material is reduced to a fine size while fixed to the catalyst-supporting carbon material supporting the catalyst ingredient.

Furthermore, the sufficiently necessary electrolyte solution is added dropwise to this suspension to cause the electrolyte material to precipitate thereby resulting in a dispersion in which the catalyst-supporting carbon material with the electrolyte material slightly fixed to it, the conductivity-aiding carbon material, and the precipitated electrolyte material are aggregated. If the gas-diffusing carbon material is added to this dispersion, in the same way as the method of (i), the electrolyte material will be fixed to or aggregate at the surface of the catalyst-supporting carbon material supporting the catalyst and the conductivity-aiding carbon material, so the surface of the gas-diffusing carbon material will be resistant to being covered by the electrolyte material and the surface properties inherently possessed by the surface of the gas-diffusing carbon material can be utilized. That is, the result becomes the structure of the two aggregated phases of the catalyst aggregated phase and gas-diffusing carbon material aggregated phase of the present invention. The catalyst aggregated phase becomes a continuous body and the gas-diffusing carbon material aggregated phase is dispersed in the catalyst aggregated phase in the structure. This method as well is effective in particular when using a gas-diffusing carbon material controlled in hydration properties of its surface.

The "good solvent for the electrolyte material" used in these methods of preparation of a catalyst layer means a solvent which substantially dissolves the electrolyte material used. It depends on the type or molecular weight of the electrolyte material, so cannot be limited, but if giving specific examples, as a good solvent for the perfluorosulfonic acid polymer contained in the commercially available Aldrich 5% Nafion® solution, methanol, ethanol, isopropyl alcohol, etc. may be mentioned.

Further, the "poor solvent for the electrolyte material" used in these preferable methods of preparation of a catalyst layer is a solvent which does not substantially dissolve the electrolyte material used. The solvent differs depending on the type or molecular weight of the electrolyte material, so cannot be specified. For example, if illustrating a poor solvent for a perfluorosulfonic acid polymer contained in the commercially available Aldrich 5% Nafion solution, hexane, toluene, benzene, ethyl acetate, butyl acetate, etc. may be mentioned.

The method for crushing or crushing and mixing in the above preferable methods of preparation of a catalyst layer of (i) or (ii) is not limited in means so long as achieving the function of crushing the large aggregate catalyst-supporting carbon material or gas-diffusing carbon material to aggregate of at least 1 μm or less. As general techniques, if giving examples, the method of utilizing ultrasonic waves, the method of mechanical crushing using a ball mill, glass beads, etc., and other methods may be mentioned.

When using a gas diffusion layer in the fuel cell of the present invention, the function of causing uniform diffusion of the gas from the gas channels formed at the separators to the catalyst layer and the function of conducting electrons between a catalyst layer and separator are sought. So long as having these minimum required functions, the layer is not particularly limited. As general examples, carbon cloth, carbon paper, or other carbon materials may be used as main component materials. If able to impart gas diffusivity and electron conductivity plus corrosion resistance, a metal mesh, metal wool, or other metal material may also be used.

As a preferable example of the structure of the gas diffusion layer, a two-layer structure where the layer at the separator side of the gas diffusion layer is made a gas diffusion fiber layer mainly comprised of a fibrous carbon material and the layer at the catalyst layer side is made a microporous layer mainly comprised of carbon black may be mentioned.

As the method of drying the ink in a film shape, the generally proposed methods can be used. The method is not particularly limited. For example, if coating the ink of the gas diffusion layer, brushing, spraying, roll coating, ink jet printing, screen printing, or other methods may be mentioned.

Alternatively, it is possible to select the method of coating the ink by a bar coater, brushing, spraying, roll coater, ink jet, screen printing, or another method and drying it to form a catalyst layer once on the surface of separate material of a polytetrafluoroethylene (PTFE) sheet or PTFE sheet or other polymer material, then bonding this with the gas diffusion layer by a hot press or other method to form a gas diffusion electrode.

The thus prepared gas diffusion electrode can be hot pressed with an electrolyte membrane such as a perfluorosulfonic acid polymer to form an assembly of an electrolyte membrane and electrode (membrane electrode assembly, MEA).

Further, the method of coating the ink on a PTFE sheet. or PTFE sheet or other polymer material by brushing, spraying, roll coating, ink jet printing, screen printing, or another method and drying it to form a catalyst layer once on a separate material, then bonding this with an electrolyte membrane such as a perfluorosulfonic acid polymer by a hot press or other method or the method of directly coating and drying ink on an electrolyte membrane such as a perfluorosulfonic acid polymer may be used to prepare a composite of a catalyst layer and electrolyte membrane, then the gas diffusion layer may be bonded with the catalyst layer by a hot press or other method to form an MEA.

The MEA prepared in the above way generally can be sandwiched between separators at its two sides to form a unit cell. These can be stacked in accordance with the required output for use as a fuel cell.

EXAMPLES

<Measurement of Physical Properties of Carbon Materials>

In showing examples of the gas diffusion electrodes and fuel cells of the present invention, eight types of carbon materials a to h were prepared as the carbon materials used. Table 1 (type of carbon material and physical properties of same) shows the various physical properties of various types of carbon materials.

Note that the nitrogen adsorption specific surface area was measured for a sample vacuum dried at 120° C. using an automatic specific surface area measurement apparatus (made by BELSORP36, made by BEL Japan) by nitrogen gas and that the one-point method based on the BET method was used to determine the specific surface area $S_{BET}$. Further, t-plot analysis was performed using the analysis program attached to the apparatus to calculate the physical properties of $S_{total}$ and $S_{micro}$. The oxygen content was the elementary analysis value. The steam adsorption was measured using a constant volume type steam adsorption apparatus (BELSORP18, made by BEL Japan). The sample was pretreated at 120° C. and 1 Pa or less for 2 hours to deaerate it, then was held at a 25° C. constant temperature. From the vacuum state, steam was gradually supplied until the saturated vapor pressure of the steam at 25° C. so as to change, the relative humidity in steps. The steam adsorption was measured during this process. From the obtained measurement results, an adsorption isotherm was drawn and the steam adsorption at a relative humidity of 90% was read from the figure. In Table 1, the read amount of steam was shown converted to a volume of steam in a standard state with the read amount of steam adsorbed per 1 g of sample. The DBP oil absorption was determined an Absorptometer (made by Brabender) converting the amount of DBP added at the time of 70% of the maximum torque to the DBP oil absorption per 100 g of the sample.

TABLE 1

| Type of carbon material | Specific surface area $S_{BET}$ m²/g | Total surface area $S_{total}$ m²/g | Micropore surface area m²/g | $S_{micro}/S_{total}$ | Oxygen content wt % | Steam adsorption mL/g | DBP oil absorption X mL/100 g | $X/S_{BET}$ |
|---|---|---|---|---|---|---|---|---|
| a | 1420 | 1628 | 1552 | 0.95 | 3.3 | — | 55 | 0.03 |
| b | 1124 | 1273 | 773 | 0.61 | 4.1 | — | 50 | 0.04 |

TABLE 1-continued

| Type of carbon material | Specific surface area $S_{BET}$ m²/g | Total surface area $S_{total}$ m²/g | Micropore surface area m²/g | $S_{micro}/S_{total}$ | Oxygen content wt % | Steam adsorption mL/g | DBP oil absorption X mL/100 g | $X/S_{BET}$ |
|---|---|---|---|---|---|---|---|---|
| c | 1329 | 1315 | 489 | 0.37 | 8.7 | — | 25 | 0.02 |
| d | 2267 | 2195 | 1151 | 0.52 | 9.6 | 2700 | — | — |
| e | 581 | 602 | 307 | 0.51 | 8.1 | 80.3 | 95 | 0.16 |
| f | 1360 | 1266 | 215 | 0.17 | 1.8 | 131 | 540 | 0.43 |
| g | 234 | 227 | 138 | 0.61 | 0.33 | 61.2 | 235 | 1.04 |
| h | 72 | 79 | — | — | <0.1 | 4.22 | 170 | 2.15 |

<Preparation of Platinum Catalysts>

In a chloroplatinic acid aqueous solution, each type of catalyst-supporting carbon material selected from among the carbon materials of Table 1 was dispersed. Each solution was warmed to 50° C. and stirred while adding a hydrogen peroxide aqueous solution, then an $Na_2S_2O_4$ aqueous solution was added to obtain a catalyst precursor. This catalyst precursor was filtered, rinsed, dried, then reduced in a 100% $H_2$ stream at 300° C. for 3 hours to prepare a Pt catalyst comprised of a catalyst-supporting carbon material on which Pt is supported at 50 mass %.

<Preparation of Catalyst Inks>

Each prepared Pt catalyst and each type of a conductivity-aiding carbon material selected from among the carbon materials of Table 1 were taken in a container. To this, a 5% Nafion solution (DE521 made by DuPont) was added. The solution was lightly stirred, then ultrasonically treated to crush the catalyst. Furthermore, while stirring, butyl acetate was added to give a solids concentration of the Pt catalyst, conductivity-aiding carbon material, and Nafion combined of 2 mass % and prepare a catalyst ink containing the Pt catalyst (catalyst-supporting carbon material on which Pt is supported), the conductivity-aiding carbon material, and Nafion (electrolyte) aggregated together. The materials, unless particularly indicated to the contrary, were mixed in ratios, with respect to the mass of the catalyst-supporting carbon material as "1", of Nafion in a mass of 1.5 and the conductivity-aiding carbon material in a mass of 0.2.

<Preparation of Gas-Diffusing Carbon Material Inks>

In separate containers, single types of gas-diffusing carbon materials selected from among the carbon materials of Table 1 were respectively taken, butyl acetate was added to give concentrations of the carbon materials of 2 mass %, and ultrasonic treatment was used to crush the carbon materials to prepare gas-diffusing carbon material inks a to I in which gas-diffusing carbon materials were aggregated.

<Preparation of Coating Inks>

The catalyst inks and the gas-diffusing carbon material inks were mixed to prepare coating inks with solids concentrations of 2 mass %. The gas-diffusing carbon materials, unless particularly indicated to the contrary, were mixed to give ratios, with respect to the mass of the total solids except for the catalyst ingredients as "1", of masses of 0.05.

<Fabrication of Catalyst Layers>

Each coating ink was sprayed on a Teflon® sheet, then was dried in argon at 80° C. for 10 minutes, then in argon at 120° C. for 60 minutes to prepare a catalyst layer. The basis weight of platinum of the catalyst layer was determined by cutting the catalyst layer on the prepared Teflon sheets into a 3 cm square piece, measuring the mass, then removing the catalyst layer by a scraper, measuring the mass of the Teflon sheet, calculating the mass of the catalyst layer from the differences with the previous mass, and calculating the basis weight from the ratio of the platinum in the solids in the catalyst ink. The sprayed amount was adjusted to give a platinum basis weight of 0.20 mg/cm².

<Fabrication of MEAs>

The prepared catalyst layers were used to prepare MEAs (membrane electrode assemblies).

For each, a Nafion membrane (N112 made by DuPont) was cut into a 6 cm square piece. A catalyst layer coated on a Teflon sheet was cut into 2.5 cm square pieces by a cutter knife. These pieces of the catalyst layer were placed as the anode and cathode at the two sides of the center of the Nafion membrane with good alignment and the assembly was hot pressed at 120° C. and 100 kg/cm² for 10 minutes. The assembly was cooled down to room temperature, then, at both the anode and the cathode, the pieces of the Teflon sheet were carefully peeled off to leave the anode and cathode catalyst layers fixed on the Nafion membrane. Next, as gas diffusion layers, commercially available carbon cloth (LT1200W made by E-TEK) was cut into 2.5 cm square pieces. These were placed at the anode and cathode with good alignment and hot pressed at 120° C. and 50 kg/cm² for 10 minutes to prepare an MEA. Note that the weight of the catalyst layers fixed in place was found from the difference of the weight of the pieces of the Teflon sheet with the catalyst layers before pressing and the weight of the pieces of the Teflon sheets after being peeled off after pressing. The basis weight of platinum was calculated from the mass ratio of the composition of the catalyst layers and was confirmed to be 0.2 mg/cm².

<Conditions for Evaluation of Fuel Cell Performances>

Each of the prepared MEAs was assembled into a cell and evaluated for fuel cell performance by a fuel cell measurement apparatus by the following procedure.

First, the following conditions were used as typical "high humidification, high load" conditions for evaluation of performance. For the gases, air was supplied to the cathode and pure hydrogen to the anode to give rates of utilization of respectively 30% and 60%. The pressures of these gases were adjusted by back pressure valves set downstream of the cell and set to 0.1 MPa. The cell temperature was set to 80° C. The supplied air and pure hydrogen were respectively bubbled in distilled water warmed to 80° C. to humidify them. The gases were supplied to the cell under these conditions, then the load was gradually increased until 1000 mA/cm² and fixed at 1000 mA/cm². The voltage across the cell terminals after the elapse of 60 minutes was recorded as the "high humidification, high load" performance.

Next, the following conditions were used as typical "low humidification, low load" conditions for evaluation of performance. For the gases, air was supplied to the cathode and pure hydrogen to the anode to give rates of utilization of respectively 30% and 60%. The pressures of these gases were adjusted by back pressure valves provided downstream of the cell and set to 0.1 MPa. The cell temperature was set to 80° C. The supplied air and pure hydrogen were respectively bubbled in distilled water warmed to 50° C. to humidify them. The gases were supplied to the cell under these conditions, then the load was gradually increased to this 100 mA/cm² and fixed at 100 mA/cm². The voltage across the cell terminals after the elapse of 30 minutes was recorded as the "low humidification, low load" performance.

<Performance Comparison 1>

First, as shown in Table 2, a catalyst layer of Example 1 comprised of a catalyst-supporting carbon material of a of Table 1, a conductivity-aiding carbon material of f of Table 1, and a gas-diffusing carbon material of h of Table 1, comprised of a catalyst aggregated phase comprised of the catalyst-supporting carbon material, conductivity-aiding carbon material, and electrolyte and a gas-diffusing carbon material aggregated phase, and structure by the catalyst aggregated phase in which the gas-diffusing carbon material aggregated phase is dispersed was prepared.

Further, as Comparative Examples 1 to 3, catalyst layers missing one of the three types of carbon materials were prepared.

Furthermore, as a comparison not taking a two-phase structure comprised of the two aggregated phases, a catalyst layer of Comparative Example 4 was prepared by the following procedure by the same ratio of composition as in Example 1. A catalyst-supporting carbon material of a Pt catalyst using a of Table 1, a conductivity-aiding carbon material of f of Table 1, and a gas-diffusing carbon material of h of Table 1 were all taken in a single container and a 5% Nafion solution (DE521 made by DuPont) was added. At this time, with respect to the mass of the catalyst-supporting carbon material as "1", Nafion was mixed in by a ratio of mass 1.5 and the conductivity-aiding carbon material was mixed in by a ratio of mass 0.2. The gas-diffusing carbon material was mixed in to give a ratio of mass 0.05 with respect to the mass of the total solids minus the catalyst ingredient as "1". Furthermore; the good Nafion solvent isopropyl alcohol was added to give a solid concentration of 2 mass %, ultrasonic treatment was used to crush the carbon material, and the catalyst-supporting carbon material, conductivity-aiding carbon material, gas-diffusing carbon material, and electrolyte were aggregated to a single aggregate to prepare a coating ink. A catalyst layer was then formed by a similar method to Example 1 to obtain the catalyst layer of Comparative Example 4.

The power generation performances when using these catalyst layers as cathode were compared. Note that, for the anodes, the catalyst layer of Example 1 was used parison was taken out from the cell after the evaluation of performance and tweezers were used to carefully peel off the gas diffusion layers. Next, the MEA from which the gas diffusion layers were peeled off was cut by a cutter knife to a size of about 5 mm square. This was affixed by carbon tape to a holder of a cryomicrotome so that the catalyst layer of the cathode can be cut. The prepared holder was set in the cryomicrotome. For the knife, a diamond trimming knife was set. At this time, the diamond trimming knife was given an angle of about 10 degrees with respect to the direction of progression of the knife and the catalyst layer was cut at a slant. This was cut at a cutting temperature of −90° C. in the depth direction of the catalyst layer at a speed of 50 nm each time for at least 100 times to prepare cut cross-sections of the catalyst layer. The prepared cut cross-sections of the catalyst layer were set together with their holders in electron microscope holders and observed for secondary electron image and reflected electron image by a 10,000X power.

In the catalyst layer of Comparative Example 4, from the secondary electron image, except for the places where it is believed the electrolyte material formed masses, the reflected electron image was observed with a uniformly bright contrast. Aggregated phases of carbon material where catalyst ingredient is not supported (gas-diffusing carbon material aggregated phase) could not be found. As opposed to this, in the catalyst layer of Example 1, the state of locations of a dark contrast in the reflected electron image among the locations which can be clearly confirmed to have carbon material present in the secondary electron image, that is, aggregated phases of carbon material where the catalyst ingredient is not supported (gas-diffusing carbon material aggregated phase), distributed in island shapes could be observed.

For a more quantitative identification, a reflected electron image was fetched as electron information by a 10,000× magnification, a resolution of 272DPI×272DPI or more, and 256 levels of color. The brightness of the fetched image was digitalized using image analysis software to display a range from dark to the 110 level by a black color and make the

TABLE 2

| Catalyst layer | Catalyst-supporting carbon material | Conductivity-aiding carbon material | Gas-diffusing carbon material | High humidification, high load | Low humidification, low load |
|---|---|---|---|---|---|
| Ex. 1 | a | f | h | 0.610 V | 0.832 V |
| Comp. Ex. 1 | a | None | None | <0.3 V | 0.653 V |
| Comp. Ex. 2 | a | None | h | 0.486 V | 0.723 V |
| Comp. Ex. 3 | a | f | None | <0.3 V | 0.733 V |
| Comp. Ex. 4 | a | f | h | <0.3 V | 0.741 V |

Among the catalyst layers prepared by the above performance comparison, the catalyst layers of Example 1 having a two-phase structure of the aggregated phases and Comparative Example 4 not having such a two-phase structure were observed for cross-sectional structures. For the observed samples, the MEA used for the performance com- range from the 111 level to the brightest 256th level become white. Next, the black points were processed for expansion once so as to determine the adjoining points. Furthermore, processing was performed to fill in the empty parts in the range to make the range appear uniform. Finally, the expanded parts were returned to their original states by contraction processing to clarify the target range. In addition, the circle equivalent diameters of the black parts were calculated from the areas of the black parts and parts less than 300 nm were all cut.

Among the remaining black parts, if counting the number of the black parts with carbon material present in the secondary electron image of the same field, there was at least one. Furthermore, if counting, among the black parts remaining even after eliminating the black parts with circle equivalent diameters of 500 nm or less, the number of the black parts with carbon material present in the secondary electron image of the same field, there was at least one. Therefore, it was confirmed that the catalyst layer of Example 1 has the preferable structure of the present invention.

As shown in Table 2, Example 1 of the present invention using a catalyst-supporting carbon material, conductivity-aiding carbon material, and gas-diffusing carbon material and having a two-phase structure of the above two aggregated phases exhibited superior performance under both high humidification, high load conditions and low humidification, low load conditions. In particular, Comparative Example 1 not including a gas-diffusing carbon material, not having a gas-diffusing single-phase material aggregated phase, and not including a conductivity-aiding carbon material in the catalyst aggregated phase and Comparative Example 3 not including a gas-diffusing carbon material and not having a gas-diffusing single phase material aggregated phase were extremely poor in high humidification, high load properties and were unable to bear loads of 1000 mA/cm² under high humidification, high load conditions. Comparative Example 2 not including a conductivity-aiding carbon material in the catalyst aggregated phase was high in internal resistance and large in voltage drop under a load of 1000 mA/cm². Further, Example 1 having a two-phase structure of the above two aggregated phases 1 exhibited superior performance under both high humidification, high load conditions and low humidification, low load conditions compared with Comparative Example 4 not having a two-phase structure.

<Performance Comparison 2>

As shown in Table 3, various catalyst layers differing in type of catalyst-supporting carbon material comprised of a catalyst-supporting carbon material of a to g of Table 1, a conductivity-aiding carbon material of f of Table 1, and a gas-diffusing carbon material of h of Table 1 were prepared to give a two-phase structure of a catalyst aggregated phase and gas-diffusing carbon material aggregated phase. The power generation performances when using these catalyst layers as cathodes were compared. Note that, for the anodes, the catalyst layer of Example 1 was used.

TABLE 3

| Catalyst layer | Catalyst-supporting carbon material | Conductivity-aiding carbon material | Gas-diffusing carbon material | High humidification, high load | Low humidification, low load |
|---|---|---|---|---|---|
| Ex. 1 | a | f | h | 0.610 V | 0.832 V |
| Ex. 2 | b | f | h | 0.578 V | 0.803 V |
| Ex. 3 | c | f | h | 0.539 V | 0.751 V |
| Ex. 4 | d | f | h | 0.566 V | 0.816 V |
| Ex. 5 | e | f | h | 0.516 V | 0.744 V |
| Ex. 6 | f | f | h | 0.559 V | 0.750 V |
| Ex. 7 | g | f | h | 0.549 V | 0.747 V |

As shown in Table 3, Examples 1, 2, and 4 using catalyst-supporting carbon materials of the present invention with specific surface areas $S_{BET}$ by BET evaluation of 1000 m²/g to 4000 m²/g and ratios $S_{micro}/S_{total}$ of the surface area $S_{micro}$ of micropores with a diameter by t-plot analysis of 2 nm or less with respect to the total surface area $S_{total}$ of 0.5 or more exhibits superior performance under both high humidification, high load conditions and low humidification, low load conditions. Among these, Example 1 using the carbon material a with an oxygen content of 3.3 mass % as the catalyst-supporting carbon material exhibited particularly superior properties.

As opposed to this, Examples 5 and 7 using carbon materials with specific surface areas $S_{BET}$ by BET evaluation of 1000 m²/g or less for the catalyst-supporting carbon materials were poor in both high humidification, high load and low humidification, low load properties. If observing the Pt catalysts used for these by TEM, the supported Pt particles aggregated and became giant. There were even some with a particle size of over 10 nm. In TEM observation of the Pt catalysts of Examples 1, 2, and 3, Pt particles of a particle size over 5 nm were not observed. Further, Examples 3 and 6 with specific surface areas $S_{BET}$ of 1000 m²/g or more yet with ratios $S_{micro}/S_{total}$ of the micropore surface areas $S_{micro}$ to the total surface area $S_{total}$ of 0.5 or less were inferior in properties of low humidification, low load conditions compared with Examples 1, 2, and 4 with ratios $S_{micro}/S_{total}$ of 0.5 or more.

<Performance Comparison 3>

As shown in Table 4, various catalyst layers differing in type of conductivity-aiding carbon material comprised of a conductivity-aiding carbon material of e, f, and h of Table 1, a catalyst-supporting carbon material of a of Table 1, and a gas-diffusing carbon material of h of Table 1 were prepared to give a two-phase structure of a catalyst aggregated phase and gas-diffusing carbon material aggregated phase. The power generation performances when using these catalyst layers as cathodes were compared. Note that, for the anodes, the catalyst layer of Example 1 was used.

TABLE 4

| Catalyst layer | Catalyst-supporting carbon material | Conductivity-aiding carbon material | Gas-diffusing carbon material | High humidification, high load | Low humidification, low load |
|---|---|---|---|---|---|
| Ex. 8 | a | e | h | 0.511 V | 0.807 V |
| Ex. 1 | a | f | h | 0.610 V | 0.832 V |
| Ex. 9 | a | h | h | 0.605 V | 0.827 V |

Examples 8, 1, and 9 of the present invention all exhibited superior performance under both high humidification, high load conditions and low humidification, low load conditions. Example 8 with a ratio $X/S_{BET}$ of the DBP oil absorption X (mL/100 g) and the specific surface area $S_{BET}$ (m$^2$/g) by the BET evaluation of 0.2 or less tended to be inferior in high humidification, high load performance compared with Examples 1 and 9 with a ratio $X/S_{BET}$ of 0.2 to 3.0 or more.

<Performance Comparison 4>

As shown in Table 5, various catalyst layers differing in type of conductivity-aiding carbon material comprised of a gas-diffusing carbon material of the carbon materials of f, g, and h of Table 1, a catalyst-supporting carbon material of a of Table 1, and a conductivity-aiding carbon material of f of Table 1 were prepared to give a two-phase structure of a catalyst aggregated phase and gas-diffusing carbon material aggregated phase. The power generation performances when using these catalyst layers as cathodes were compared. Note that, for the anodes, the catalyst layer of Example 1 was used.

TABLE 5

| Catalyst layer | Catalyst-supporting carbon material | Conductivity-aiding carbon material | Gas-diffusing carbon material | High humidification, high load | Low humidification, low load |
|---|---|---|---|---|---|
| Ex. 10 | a | f | f | 0.498 V | 0.792 V |
| Ex. 11 | a | f | g | 0.536 V | 0.814 V |
| Ex. 1 | a | f | h | 0.610 V | 0.832 V |

Examples 10, 11, and 1 of the present invention all exhibited superior performance both under high humidification, high load conditions and under low moisture, low load conditions. Example 10 with a ratio $X/S_{BET}$ of the DBP oil absorption X (mL/100 g) and the specific surface area $S_{BET}$ (m$^2$/g) by the BET evaluation of less than 1.0 tended to be inferior in high humidification, high load performance compared with Examples 11 and 1 with a ratio $X/S_{BET}$ of 1.0 or more.

<Performance Comparison 5>

As shown in Table 6, catalyst layers comprised of a catalyst-supporting carbon material of a of Table 1, a conductivity-aiding carbon material of f of Table 1, a gas-diffusing carbon material of h of Table 1, and only a ratio of mixture of the conductivity-aiding carbon material changed in stages to give a ratio, with respect to the mass of the catalyst-supporting carbon material as "1", of the conductivity-aiding carbon material of a mass of 0.05 to 0.5 were prepared to give a two-phase structure of a catalyst aggregated phase and gas-diffusing carbon material aggregated phase. The power generation performances when using these catalyst layers as cathodes were compared. Note that for the anodes, the catalyst layer of Example 1 was used.

TABLE 6

| Catalyst layer | Catalyst-supporting carbon material | Conductivity-aiding carbon material Type | Conductivity-aiding carbon material Mass indexed to mass of catalyst-supporting carbon material as "1" | Gas-diffusing carbon material | High humidification, high load | Low humidification, low load |
|---|---|---|---|---|---|---|
| Ex. 12 | a | f | 0.05 | h | 0.546 V | 0.766 V |
| Ex. 13 | a | f | 0.1  | h | 0.603 V | 0.818 V |
| Ex. 1  | a | f | 0.2  | h | 0.610 V | 0.832 V |
| Ex. 14 | a | f | 0.3  | h | 0.604 V | 0.812 V |
| Ex. 15 | a | f | 0.4  | h | 0.593 V | 0.804 V |
| Ex. 16 | a | f | 0.5  | h | 0.588 V | 0.783 V |

Examples 1 and 12 to 16 of the present invention all exhibited superior performance both under high humidification, high load conditions and under low moisture, low load conditions. In particular, Examples 1 and 13 to 15 where the mass of the conductivity-aiding carbon material was in the range of 0.1 to 0.4 with respect to the mass of the catalyst-supporting carbon material as "1" were particularly superior in performance in the results.

INDUSTRIAL APPLICABILITY

According to the fuel cell according to the present invention, management of the moisture (humidity) of a fuel cell system becomes easy, so the environmental adaptability is high, system control and operation become simple, and also the power generation efficiency rises. Due to this, the fuel cell can be utilized not only for transport equipment and industrial equipment applications, but also home battery or consumer equipment applications. The applicant is confident that this will greatly contribute to the spread and promotion of use of fuel cells.

EXPLANATION OF REFERENCES

1 . . . gas-diffusing carbon material aggregated phase
2 . . . gas-diffusing carbon material
3 . . . catalyst aggregated phase
4 . . . conductivity-aiding carbon material
5 . . . catalyst-supporting carbon material supporting catalyst ingredient
6 . . . electrolyte material

The invention claimed is:

1. A fuel cell comprising: a proton-conducting electrolyte membrane sandwiched between a pair of catalyst layers and a separate pair of gas diffusion layers,
wherein at least a catalyst layer of a cathode comprises a catalyst ingredient, an electrolyte material, and a carbon material,
the carbon material comprising:
a catalyst-supporting carbon material supporting the catalyst ingredient,
a conductivity-aiding carbon material not supporting the catalyst ingredient, and
a gas-diffusing carbon material not supporting the catalyst ingredient; and
wherein the catalyst layer of the cathode comprises:
catalyst aggregates, each of which comprising the catalyst-supporting carbon material supporting the catalyst ingredient, the electrolyte material, and the conductivity-aiding carbon material not supporting the catalyst ingredient as main ingredients aggregated together, and
gas-diffusing carbon material aggregates, each of which comprising the gas-diffusing carbon material not supporting the catalyst ingredient as a main ingredient aggregated together which is free of a fluorinated compound,
wherein the catalyst aggregates connect by direct contact to form a continuous matrix, and the gas-diffusing carbon material aggregates are dispersed in the matrix of the catalyst aggregates.

2. The fuel cell as set forth in claim 1, wherein the catalyst-supporting carbon material has a specific surface area, $S_{BET}$, as determined by a BET evaluation, of 1000 m²/g to 4000 m²/g, and a ratio, $S_{micro}/S_{total}$, of a micropore surface area, $S_{micro}$, of micropores having a diameter of 2 nm or less, as determined by t-plot analysis, and a total surface area, $S_{total}$, of 0.5 or more.

3. The fuel cell as set forth in claim 1, wherein the conductivity-aiding carbon material has a ratio, $X/S_{BET}$, of DBP oil absorption, X (mL/100 g), and a specific surface area, $S_{BET}$ (m²/g), as determined by a BET evaluation, of 0.2 to 3.0.

4. The fuel cell as set forth in claim 1, wherein the gas-diffusing carbon material has a ratio, $X/S_{BET}$, of DBP oil absorption, X (mL/100 g), and a specific surface area, $S_{BET}$ (m²/g), as determined by a BET evaluation, of 1.0 or more.

5. The fuel cell as set forth in any one of claims 1 to 4, wherein in a field of an area of 10 μm×10 μm at a cross-section of the catalyst layer, there is at least one gas-diffusing carbon material aggregate not supporting a catalyst ingredient having a circle equivalent diameter of 300 nm or more.

* * * * *